US005528014A

United States Patent [19]

Goldberg et al.

[11] Patent Number: 5,528,014

[45] Date of Patent: Jun. 18, 1996

[54] TOY OVEN

[76] Inventors: Harvey Goldberg, 8 Northbank Court, Thornhill, Ontario, Canada, L3T7J7; David C. K. Kwan, Block A&B, 3/F,CWD Bldg., 382-392 Castle Peak Road, Tsuen Wan N.T., Hong Kong; Steven Lebensfeld, 805 Pond La., Woodsburgh, N.Y. 11598

[21] Appl. No.: 388,525

[22] Filed: Feb. 14, 1995

Related U.S. Application Data

[62] Division of Ser. No. 111,143, Aug. 24, 1993.

[30] Foreign Application Priority Data

Aug. 24, 1992 [GB] United Kingdom .................. 9217977
Jul. 2, 1993 [GB] United Kingdom .................. 9313760

[51] Int. Cl.[6] .............................. A21B 1/52; F24C 7/10; F27D 1/18

[52] U.S. Cl. .......................... 219/386; 219/387; 219/392; 219/522; 126/19 R; 126/273 R; 432/250; 446/481

[58] Field of Search .................................. 219/385, 386, 219/387, 391, 392, 393, 395, 521, 522; 126/19 R, 190, 198, 273, 275 E, 275 R; 432/250; 193/4, 5; 110/116; 296/61; 312/121, 124; 470/180; 446/481

[56] References Cited

U.S. PATENT DOCUMENTS

| | | | |
|---|---|---|---|
| D. 303,391 | 9/1989 | Wehmeyer | D21/122 |
| 4,249,067 | 2/1981 | Cummings | 219/392 |
| 4,476,848 | 10/1984 | Protas | 126/19 M |
| 4,563,573 | 1/1986 | Hartelius et al. | 219/405 |
| 4,772,243 | 9/1988 | Zeiss | 446/481 |

*Primary Examiner*—Teresa J. Walberg
*Assistant Examiner*—J. Pelham
*Attorney, Agent, or Firm*—Rosen, Dainow & Jacobs

[57] ABSTRACT

A toy oven has a heating compartment accessible through an aperture in a front wall of a housing of the oven. A door is provided which is manually movable to close off the aperture. IN one embodiment, the door is slidably mounted and in another embodiment it is pivotally mounted. A mechanical interlock engages the door to prevent it from opening if the electrical power switch is on. Another mechanical interlock prevents the door from opening when the heating compartment is at a high temperature. The oven is thus safe to use by children in normal play. A fan may be provided to cool the heating compartment when the power switch is turned off and is thereafter automatically turned off after a predetermined time or when the temperature in the heating compartment falls to a safe level. A timer may also be provided to automatically switch power off after a predetermined time of inactivity.

3 Claims, 11 Drawing Sheets

TOY OVEN

This application is a division of application Ser. No. 08/111,143, filed Aug. 24, 1993, now pending.

BACKGROUND OF THE INVENTION

The invention disclosed herein relates to a toy oven or cooker.

U.S. Pat. Nos. 4,772,243 (Zeiss), 4,563,573 (Hartelius et al.), 4,249,067 (Cummings), 3,548,146 (Hoyland) and 3,368,063 (Kuhn) disclose toy ovens which protect against accidental burning of a child playing with the oven.

OBJECTS AND SUMMARY OF THE INVENTION

It is an object of the invention disclosed herein to improve the safety of toy ovens by preventing access to the interior of the oven when it is hot and/or when the switch controlling power to the oven heating element(s) is on.

It is another object of the invention to more quickly cool the interior of a toy oven after the switch controlling power to the heating element(s) has been turned off to enable quick, safe access to the interior of the oven.

It is another object of the invention to automatically switch power to a toy oven off when the oven is not in use.

The invention provides a toy oven including means for carrying out one or more of the following functions, and thereby achieves various of the above objects: locking an oven door in a closed position when the temperature in the oven is above a predetermined temperature; locking the oven door in a closed position when the switch which controls power to the oven heating element(s) is on; providing cooling means and means for automatically starting the cooling means when the switch is switched off and then automatically stopping the cooling means after a predetermined time and/or after the temperature in the oven falls below a predetermined temperature; and automatically switching power to the heating element(s) off when the oven is not in use, e.g., a predetermined time after the oven has been inactive.

In accordance with the invention, a toy oven is provided having a heating compartment, an aperture in the oven through which an article to be heated can pass to enter the heating compartment, a door, means mounting the door to the oven to be movable under control of a user of the toy oven (e.g. manually) between a closed position blocking the aperture and an open position permitting access to the aperture, and means automatically preventing the door from being moved to its open position when the temperature in the compartment is above a predetermined temperature.

In the preferred embodiment, the oven includes a temperature responsive element mounted to be responsive to the temperature in the heating compartment, and a mechanical interlock arrangement coupled to the temperature responsive element for preventing the door from being moved to its open position if the compartment is at a temperature above the predetermined temperature.

In one embodiment, the door is mounted to be slidably moved manually between the open and closed positions, and in another embodiment, the door is mounted to be manually pivotally moved between the open and closed positions.

Also in accordance with the invention, the toy oven includes a switch manually movable between on and off positions for selectively supplying power to the heating element(s) within the oven, and means for automatically preventing the door from being moved to its open position when the switch is in its on position. In the preferred embodiment, such means comprise a mechanical interlock arrangement coupled to the switch.

A toy oven in accordance with the invention may include either or both means described above for preventing the door from being moved to its open position, and in the preferred embodiments, includes a mechanical interlock arrangement or arrangements which prevent the door from being moved to its open position if the compartment is at a temperature above a predetermined temperature and if the switch is in its on position.

The toy oven may include a timer arranged to automatically disconnect power to the heating element(s) a predetermined time after the switch is turned on.

The toy oven may include a fan mounted in the oven and means for turning the fan on whenever the switch is turned off to blow air over the heating compartment. Means are also provided for turning the fan off automatically after a predetermined time period or when the temperature in the oven falls below the predetermined temperature. The means for automatically turning the fan off may include a timer, and/or a temperature responsive element coupled in the circuit supplying power to the fan to switch power to the fan off when the temperature in the heating compartment falls below the predetermined temperature.

A toy oven in accordance with the invention may include a fan and/or a timer with or without the means preventing moving the door to its open position described above.

The toy oven preferably includes an indicator mounted inside the oven and visible from outside the oven, in which the indicator is coupled to a temperature responsive element so as to provide an indication when the temperature is above the predetermined temperature.

BRIEF DESCRIPTION OF THE DRAWINGS

The invention is illustrated in the figures of the accompanying drawings which are meant to be exemplary and not limiting, in which like numerals refer to like or corresponding parts, and in which.

DESCRIPTION OF THE PREFERRED EMBODIMENTS

Figure 1:
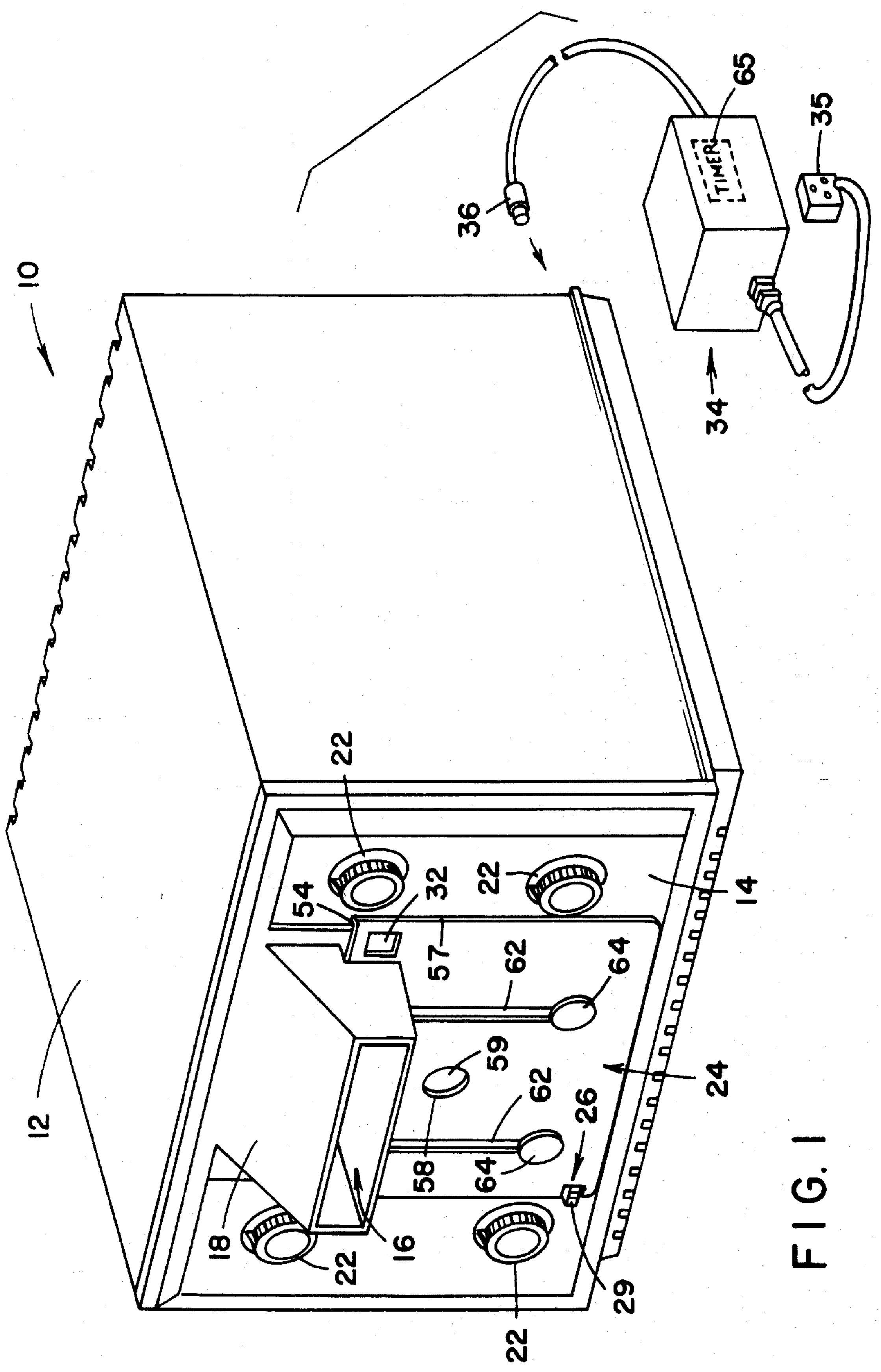
FIG. 1 is a perspective view of a toy oven according to one embodiment of the invention depicted with a sliding oven door in its upper position blocking an aperture into the heating compartment of the oven.
Figure 10A:
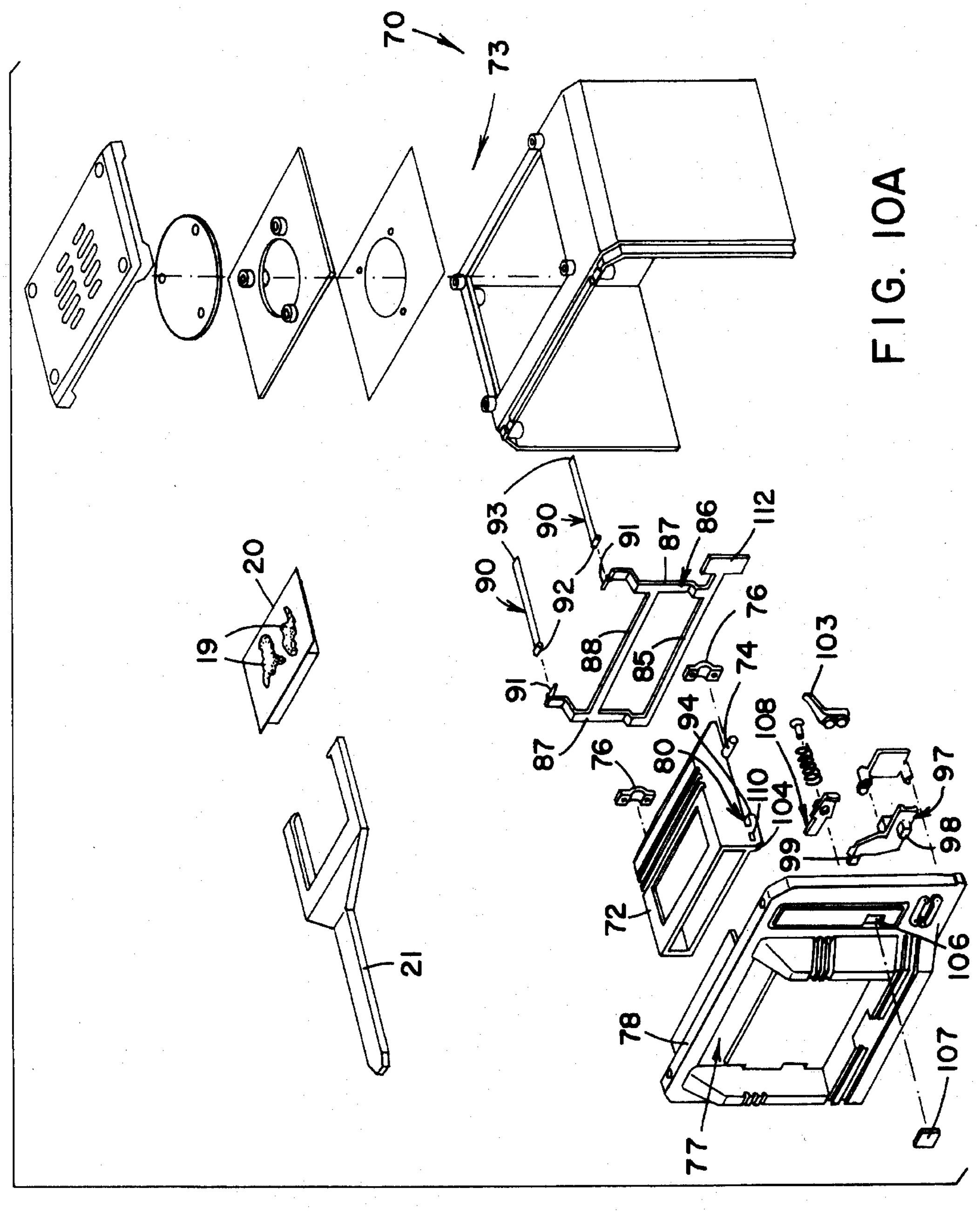
FIGS. 10A and 10B together are an exploded perspective view of the oven depicted in FIG. 5.

Referring to FIG. 1, the toy oven 10 according to one embodiment of the invention has a ventilated generally box-like plastic housing 12 with a front wall 14. An aperture 16 in the front wall has a forwardly projecting extension 18 to guide and support articles being inserted into oven 10 to be heated or cooked therein. Generally, the articles may be food or material to be molded or otherwise formed into toy objects such as human and non-human figures, jewelry, flowers and other objects (e.g., molding material 19 in a mold 20 in FIG. 10A), etc., and are placed in the oven 10 using a flat shovel (e.g., shovel 21 in FIG. 10A) on which the articles are supported as they are transported into a heating compartment 30 (FIGS. 2 and 3) of the oven 10. The shovel 21 is sized to fit against the bottom and between the sides of the extension 18. The front wall 14 has integrally molded imitation control knobs 22 which serve no operational purpose. A planar sliding door 24 (FIGS. 1, 2 and 4) is mounted against the front wall 14 and is manually slidably moveable up and down so as to close off the aperture 16 as required. The door 24 is shown in FIG. 1 in a closed position and has a slot or notch 26 in one side. An electrical power switch 28 (FIG. 2) mounted on the front wall 14 has a button 29 (FIG. 1) which is movable left and right to control power supplied to heating elements 42 of the heating compartment 30 (FIG. 3) of the oven. In an on position, the button 29 of switch 28 fits into the slot 26 as shown in FIG. 1, and in this position mechanically interlocks with and prevents the door 24 from being slid downwardly to its open position. A power supply pack 34 includes a transformer (not shown) for converting a mains supply, 120 or 220 volts AC, to 20 volts AC (5 amps). A plug 35, which may include a fuse, couples the power pack 34 to an AC line, and the stepped down AC from power pack 34 is provided at connector 36, which is coupled to power switch 28.

A small aperture 32 (FIGS. 1 and 4) is provided in the door 24 and is preferably closed by a plastic cover (not shown) to prevent direct access to the inside of the housing 12. A visual indicator (described below) viewable through aperture 32 is provided to indicate when the temperature in the oven is above a predetermined temperature.

Figure 2:
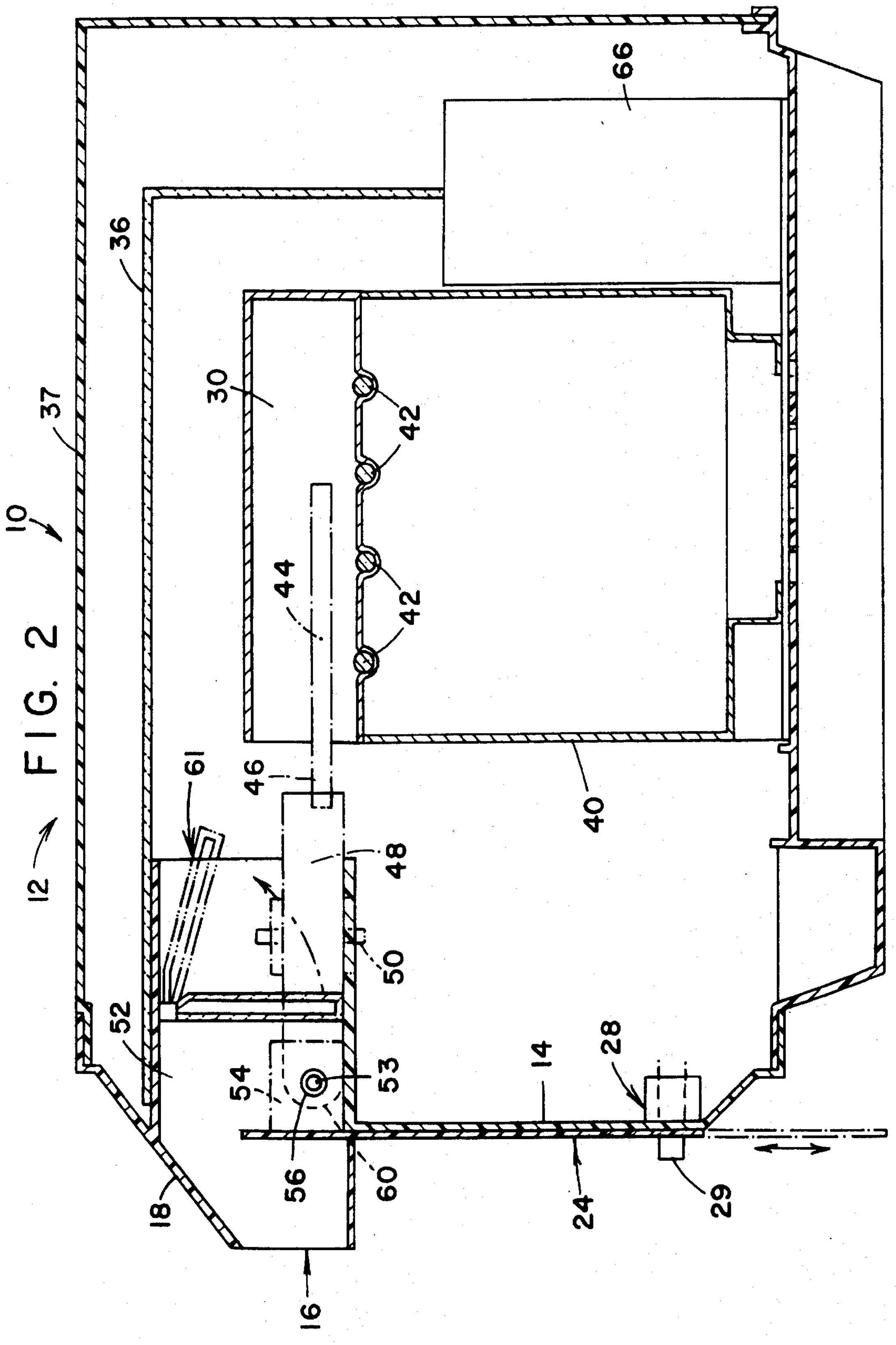
FIG. 2 is a sectional side view of the oven depicted in FIG. 1.
Figure 3:
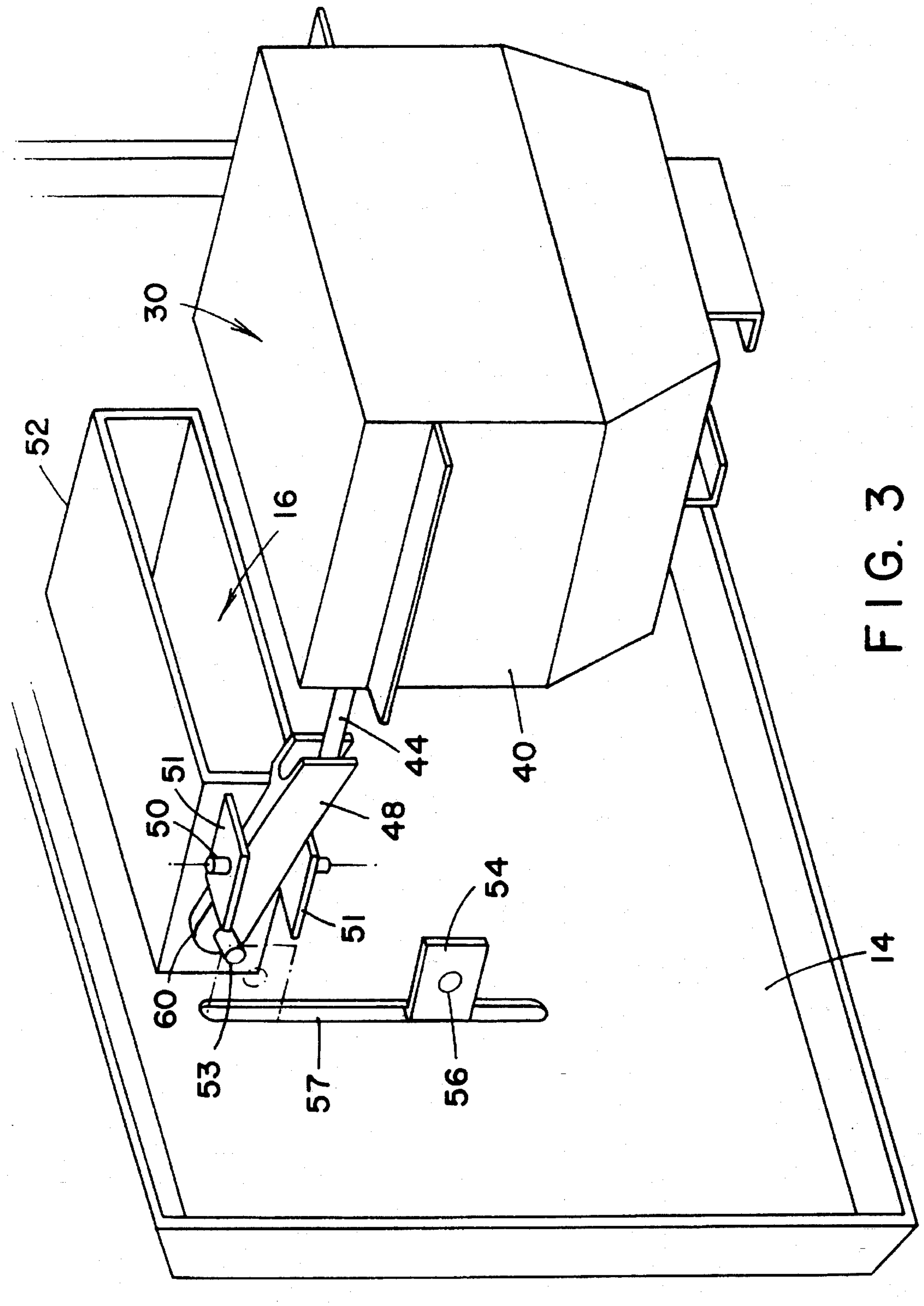
FIG. 3 is a perspective view from the inside of the oven depicted in FIG. 1 showing the heating compartment of the oven and a bi-metallic element coupled to a mechanical interlock for the oven door.

Referring to FIGS. 2 and 3, the housing 12 has inner walls 36 to provide insulation of the outer walls 37 from heat generated in heating compartment 30 which is supported by a stand 40 fabricated from thin metal sheets. A number of heating elements 42, mounted in the bottom surface of the compartment 30, are supplied with power from the power pack 34 via the power switch 28. A temperature responsive element in the form of a bi-metallic element 44 is anchored at one side of heating compartment 30 with its free end 46 movable in a horizontal plane in response to temperature changes in the heating compartment 30 so as to horizontally pivot a forked bar 48 about the vertical axis of a supporting spindle 50. The forked bar 48 is mechanically coupled to the free end of the bi-metallic element 44, and the spindle 50 is vertically supported by brackets 51 attached to an inlet chute 52 which guides articles to be heated from aperture 16 to heating compartment 30. A stop 53 mounted on a forward end of the bar 48 cooperates with a projection 54 (FIG. 3) mounted on the door 24 to lock the door 24 in its closed position. Projection 54 extends into oven housing 12 through a slot 57 (FIG. 4) in front wall 14. When the temperature of the heating compartment is above a predetermined magnitude, the stop 53 is caused by the bi-metallic element 44 to enter into an aperture 56 in the projection 54 so that the door 24 cannot be moved towards its open position.

Door 24 is releasably held in its closed position by a detent comprising a hole 58 (FIG. 1) in door 24 and a projection 59 on front wall 14. The projection 59 is shaped so that it enters and moves out of hole 58 with little force applied to door 24. As discussed above, when the button 29 of the power switch 28 is switched to its on position, it engages slot 26 and positively locks the door 24 in its closed position.

A temperature indicator is formed by a front face 60 (FIGS. 2 and 3), which is preferably a brightly colored, of the forward end of the bar 48. The front face indicator 60 can be observed through the aperture 32 in the door 24 whenever the bar 48 is in a position with the stop 52 in the aperture 56. This serves to indicate to the outside of the housing 12 that the temperature of the heating compartment 30 is above the predetermined temperature. When the bar 48 is pivoted so that the stop 52 moves out of the aperture 52, the front face indicator 60 of the bar 48 is no longer visible through the aperture 32.

Referring to FIG. 2, a heat insulation door 61 is provided inside the housing 12 in chute 52 behind the aperture 16 in the front wall 14. The door 61 is pivotally supported along its top edge and normally remains closed under the force of gravity except when the shovel 21 (FIG. 10A) is slid in and out of the oven 10, as explained earlier, to place articles 19 into and to remove the articles from the heating compartment 30.

Figure 4:
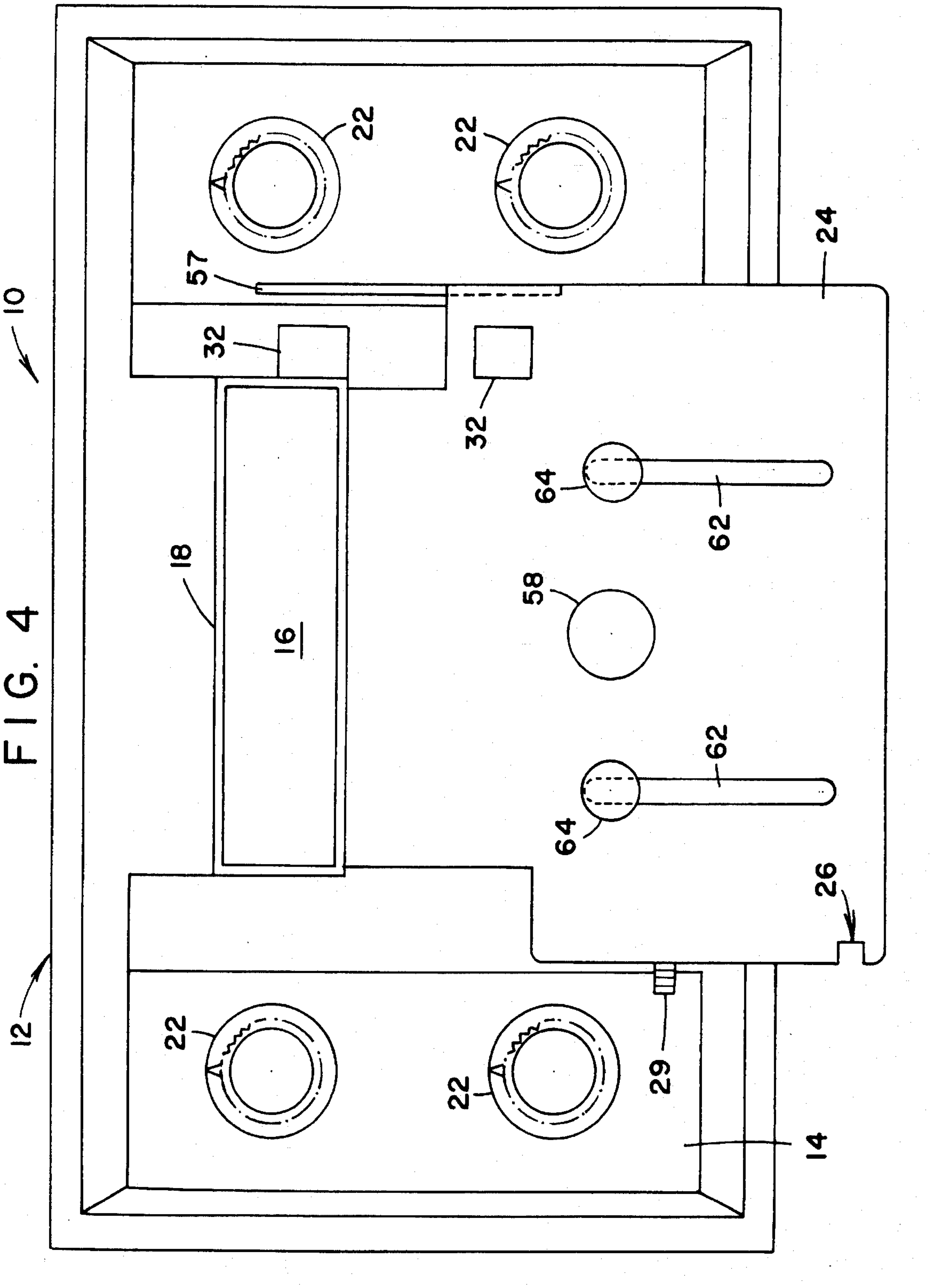
FIG. 4 is a front view of the oven depicted in FIG. 1 with the oven door in its lower position in which the aperture to the heating compartment of the oven is unblocked.

In FIG. 4, the door 24 is shown in an open position slid downwardly from the position in FIG. 1 as is required to enable access to the heating compartment 30 from outside the housing 12. The door 24 is slidably attached to the front wall 14 by vertically extending slots 62 in door 24 and the heads 64 of bolt-like elements having shafts (not shown) which extend through slots 62 and are attached in any suitable manner to oven housing 12, the heads 64 being larger than slots 62 to thereby retain door 24 slidably against front wall 14.

In use, articles are placed in and removed from the heating compartment 30 as required. The door 24 cannot be opened if the power switch 28 is on or the heating compartment 30 is above the predetermined temperature. The mechanical interlocking between the door 24 and the switch 28 and between the door and the temperature responsive bi-metallic element 44 prevent access to inside of the oven housing 12 either when the power to the heating compartment is on or the temperature inside the oven 10 is high. This ensures that the oven 10 is safe to use by children at play. It will also be noted that the voltage of the power used by the oven 10 is also at a low and safe magnitude.

A timer 65 (FIG. 1) is provided (e.g. in power pack 34) which is set to prevent the power to the heating elements 42 from remaining on if the oven 10 is turned on and left on for more than a predetermined time. Timer 65 may be conventional and is arranged to limit the maximum time of heating to about half an hour to not more than two hours. A child at play may lose interest or be distracted and forget to turn the oven off during play. The timer 65 ensures that the oven will not remain on indefinitely if left unattended. Timer 65 may be conventional and will be known to those skilled in the art, and for example may be responsive to current flow.

It will be appreciated that after each cooking period, the door 24 cannot normally be opened until the heating compartment 30 has cooled down. If this takes too long, a child may become frustrated and so a fan 66 (FIG. 2) may be fitted inside the housing 10. The fan 66 turns on automatically as soon as the power switch 28 is turned off and circulates air around the heating compartment 30 to speed up cooling. The fan may be controlled by the timer 65 described above so as to run only for a fairly short time period and/or be controlled according to the position of the free end 46 of the element 44 so as to be turned on only if, and for so long as, the temperature of the heating compartment 30 is above the predetermined temperature. Alternatively, a temperature sensitive element may be connected in the fan power circuit. The manner of electrically connecting fan 66 to function as described will be known to those of skill in the art.

Figure 5:
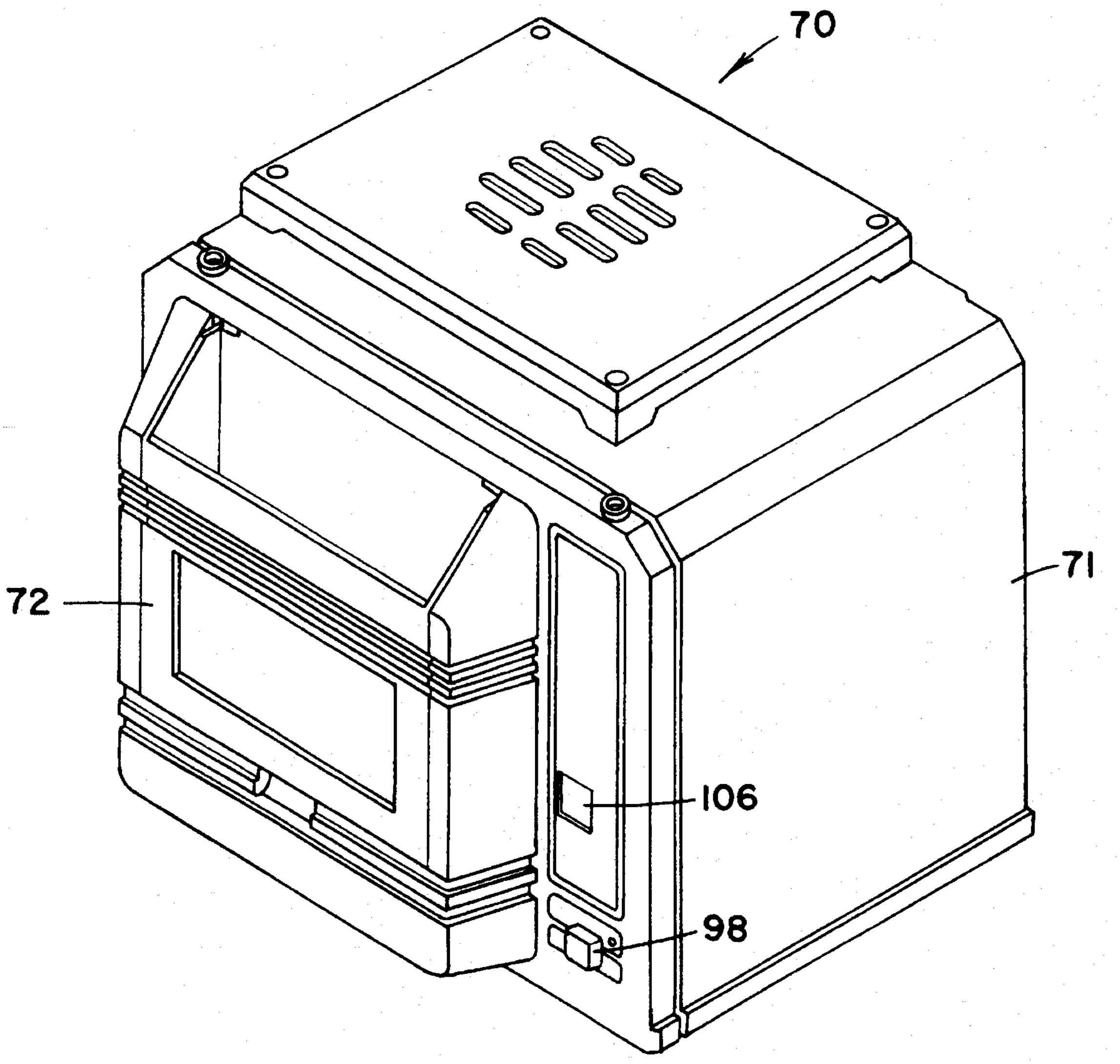
FIG. 5 is a perspective view of a toy oven according to another embodiment of the invention depicted with a pivoting oven door in its closed position blocking an aperture into the heating compartment of the oven.

Referring to FIGS. 6–10, another embodiment of a toy oven 70 with manually movable and, lockable oven door 72 is depicted. Toy oven 70 operates in a generally similar manner to toy oven 10 described above, and similar to oven 10 includes a mechanical interlock for locking the oven door 72 which prevents the oven door from being opened when the temperature in the heating compartment of the oven is above a pre-determined value and also when the power switch is in the on position. Oven 70 includes a ventilated, generally box-like housing 71 which contains a heating compartment referenced generally by numeral 73 in FIG. 10A. The mechanical interlocks prevent access through aperture 77 to the interior of the oven housing 71 when the oven is hot or the power is on. Toy oven 70, however, includes a pivotally mounted door 72 instead of a sliding door, and has a somewhat different mechanical interlocking arrangement for door 72. Door 72 of oven 70 is pivotally supported by pivot pins or axles 74 (FIGS. 7–10) projecting from opposite sides of the door 72 which are received in generally U-shaped brackets 76 attached to the inside of the oven front wall 78. The door 72 pivots about pins 74 between a closed position shown in FIGS. 5, 7 and 8 and an open position shown in FIGS. 6 and 9.

The door 72 has interlocking formations 80 and 81 which cooperate with a locking bar 85 extending across the inside of the oven front wall 78. The locking bar 85 forms part of a gate or shutter 86 (FIG. 10A) comprising two vertically extending arms 87 connected to opposite ends of the locking bar 85. The tops of the vertically extending arms 87 are supported from two bi-metallic elements 90 by means of pins 91 projecting from the top ends of the support arms 87 received in loops 92 formed at the ends of bi-metallic elements 90. Hooks 89 on the inside of front oven wall 78 receive and retain the locking bar 85 therein when the gate 86 is in its upper position shown in FIGS. 7 and 9 with the door 72 opened or closed. The other ends 93 of the bi-metallic elements extend into the heating compartment (FIGS. 10A) of the oven. When the heating compartment 73 is above a predetermined temperature, the bi-metallic elements 90 bend downwardly (FIG. 8) adjacent the door 72 and urge the locking bar 85 downwardly behind upwardly extending projections 94 on the interlocking formations 80 and 81 to prevent the door 72 from being opened. This mechanical interlocking arrangement of the locking bar 85 on the oven front wall, the interlocking formations 80 and 81 on the door, the bi-metallic elements 90 extending into the heating compartment, and associated parts prevents the door 72 from being opened while and whenever the inside of the heating compartment 42 is too hot for the safety of the child or children playing with the oven.

Figure 6:
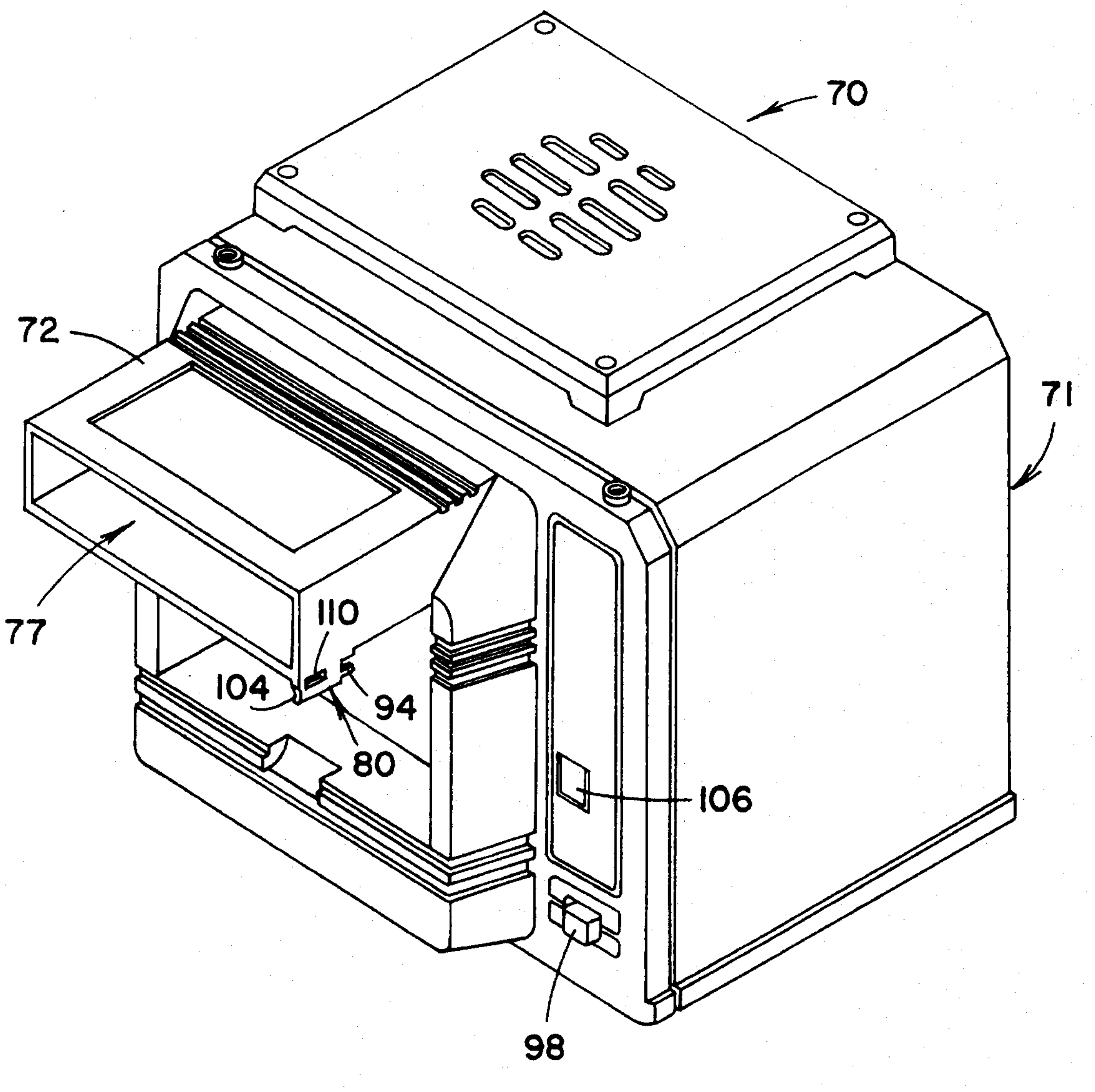
FIG. 6 is a perspective view of the oven depicted in FIG. 5 with the oven door in its open position in which the aperture to the oven's heating compartment is unblocked.

The oven 70 includes an electrical on-off power switch 96 (FIG. 10B) which has an operating handle 97 (FIGS. 7–9 and 10A) attached to the inside of the oven front wall 78. The operating handle 97 has a button 98 (FIGS. 5 and 6) projecting through front wall 78 to the outside of the oven and a finger 99 (FIGS. 7–9) on the inside of the front wall. The operating handle 97 also includes a hollow bar 100 (FIGS. 7–9) extending into the oven which receives and engages the button 102 (FIG. 10B) on the electrical switch 96 which is mounted to the bottom 101 (FIG. 10B) of the oven 70 adjacent the front wall 78. To turn the power switch 96 on, the button 98 on button handle 97 is slid from right to left as seen in FIG. 6.

Figure 7:
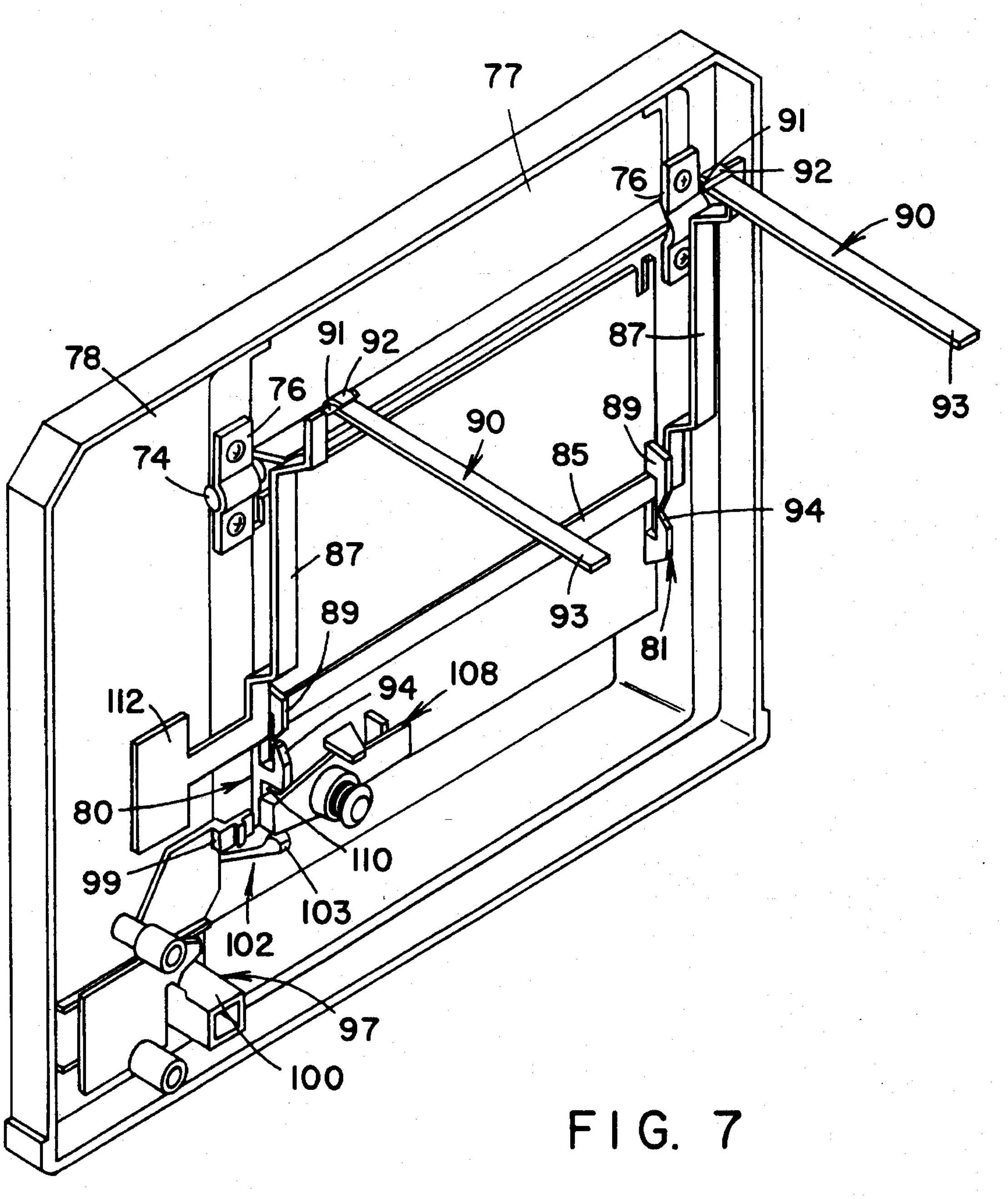
FIG. 7 is perspective view of the front wall of the oven depicted in FIG. 5 from inside the oven showing bi-metallic elements coupled to a mechanical interlock for the oven door with the door in its closed position and a switch handle for the oven's power switch in its off position.
Figure 8:
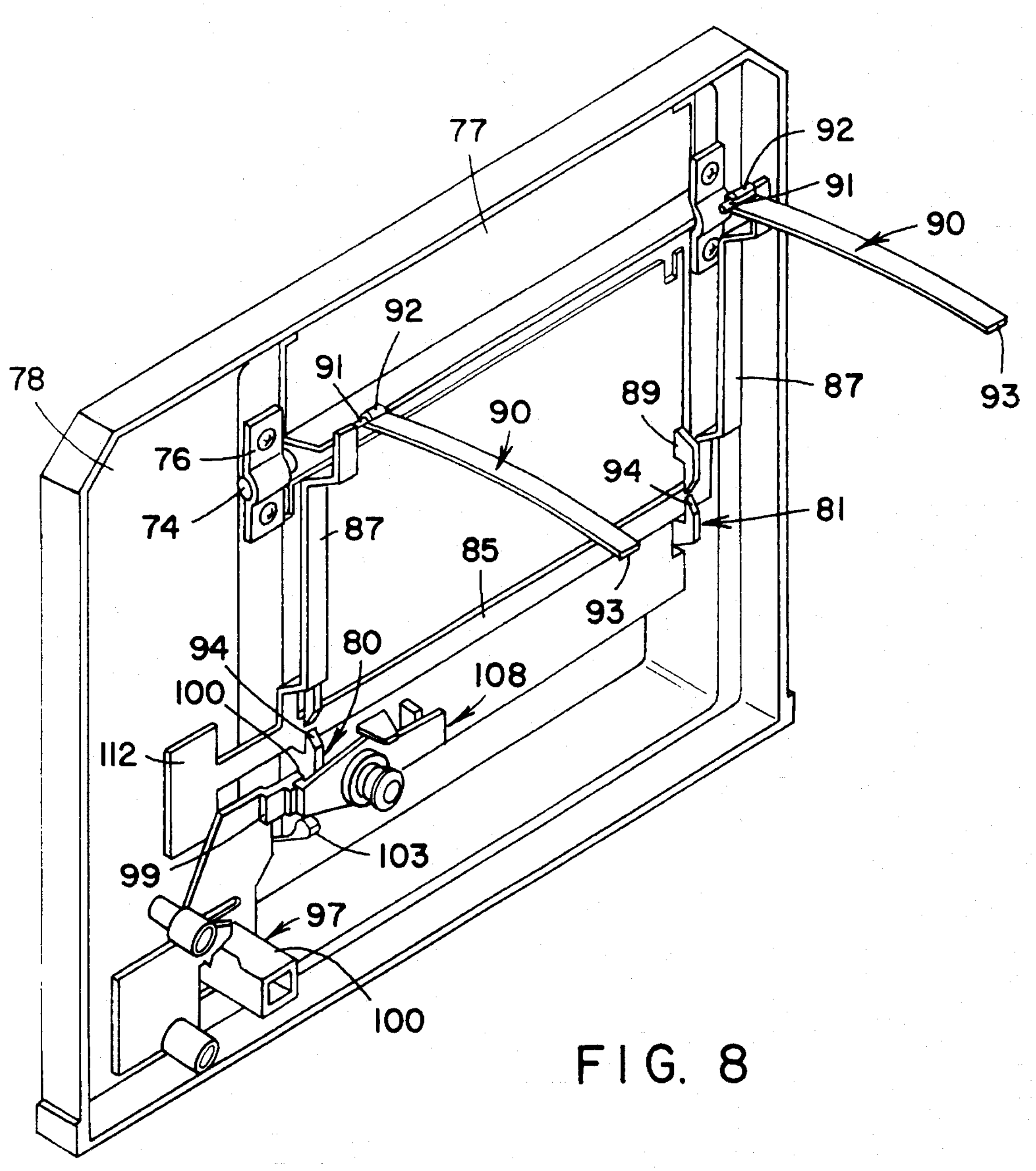
FIG. 8 is a view similar to FIG. 7 but with the power switch handle of the power switch in its on position.
Figure 9:
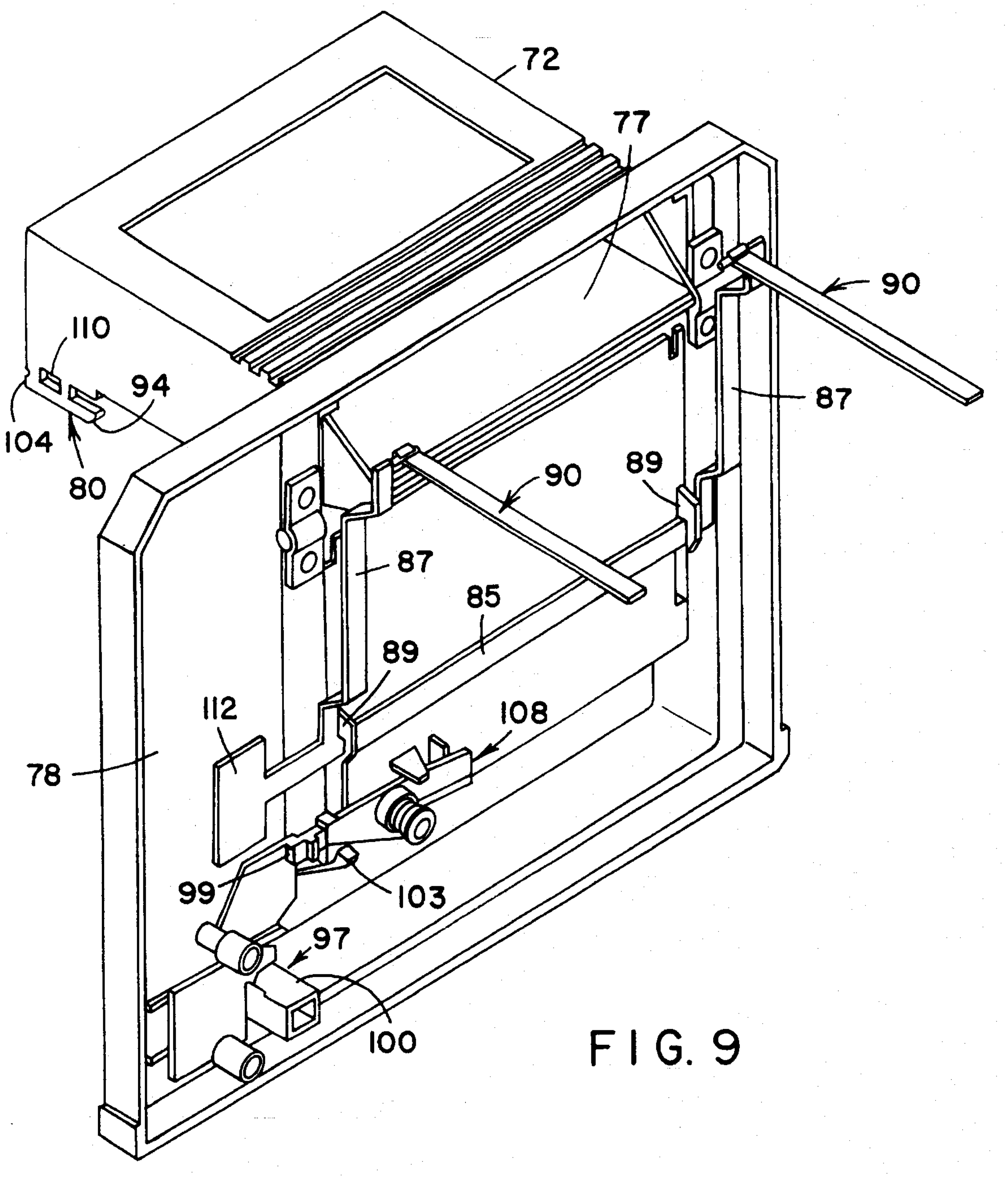
FIG. 9 is a view similar to FIG. 7 but with the oven door in its open position.

A latch referenced generally by numeral 102 in FIGS. 7–9 holds door 72 in its closed position when the power switch 96 is off and the heating compartment 73 is cool. Latch 102 includes a flexible finger 103 attached to front oven wall 78 which flexibly and releasably engages a recess 104 in the interlocking formation 80 on door 72. The spring force of finger 103 is easily overcome to latch and unlatch door 72.

Similar to aperture 32 in oven 10, a small aperture 106 (FIG. 6) is provided in the front wall 78 of oven 70 through which is viewable a visual indicator of whether the temperature in the oven is above a predetermined temperature. As is the case with aperture 32 in oven 10, aperture 106 is preferably closed by a plastic cover 107 (FIG. 10A) to prevent direct access to the inside of the oven housing 71. A spring loaded bar 108 is mounted in the lower right (as seen in FIG. 9) corner of front wall 78 adjacent aperture 106, and is biased towards the aperture 106. In the biased position of bar 108 shown in FIG. 9, one end of the bar 108 lies in the path of the finger 99 of the switch handle 97 and prevents the finger 99 from sliding to the left and hence prevents sliding of the power switch 96 to its on position. When the door 72 is closed, however, the bar 108 is moved sufficiently out of the path of finger 99 by the interlocking formation 80 on the door (FIG. 7) to allow the finger 99 to move to the left and allow the power switch 96 to be moved to its on position. When the door 72 is closed, and the switch handle 97 is in the on position (FIG. 8, which also shows the bi-metallic elements 80 bent in the heated condition of the heating compartment), the finger 99 enters a slot 110 provided in the formation 80 which then prevents the door 72 from being opened.

Thus, the interlock between the finger 99 and the slot 110 prevents the door 72 from being opened until the electric power has been turned off, because only when the switch handle 97, and hence the switch 96, is turned off does the finger 99 move out of the slot 110.

A brightly colored extension 112 is attached to the end of locking bar 85 adjacent aperture 106, and is visible through aperture 106 when the locking bar is in its lowered, door locking position (FIG. 8). The extension 112 provides a visual indication of whether the temperature in heating compartment 73 is above a predetermined temperature, as discussed above.

Referring to FIG. 9, with the door 72 open, articles 19 (FIG. 10A) may be moved into the heating compartment 73. Thereafter, door 72 may be closed (FIG. 7) and the power switch 96 may be moved to its on position to commence heating. Initially, the bi-metallic strips 93 are horizontal as shown in FIG. 7. At this point, the door 72 cannot be opened because finger 69 is engaged in slot 110 of formation 80. As the oven heats, the bi-metallic strips 93 bend (FIG. 8) and cause the locking bar 85 to engage the projections 94 on formations 80 and 81. At this point the oven door 72 cannot be opened even if the power switch 96 is turned off. Finally, with the power switch 96 off and the bi-metallic strips 93 horizontal (FIG. 9), the door 72 can be opened.

Thus, in toy oven 70, the door 72 cannot be opened after cooking use until the power has been turned off and also the inside of the heating compartment has cooled down sufficiently for safe removal of the cooked articles.

Figure 10B:
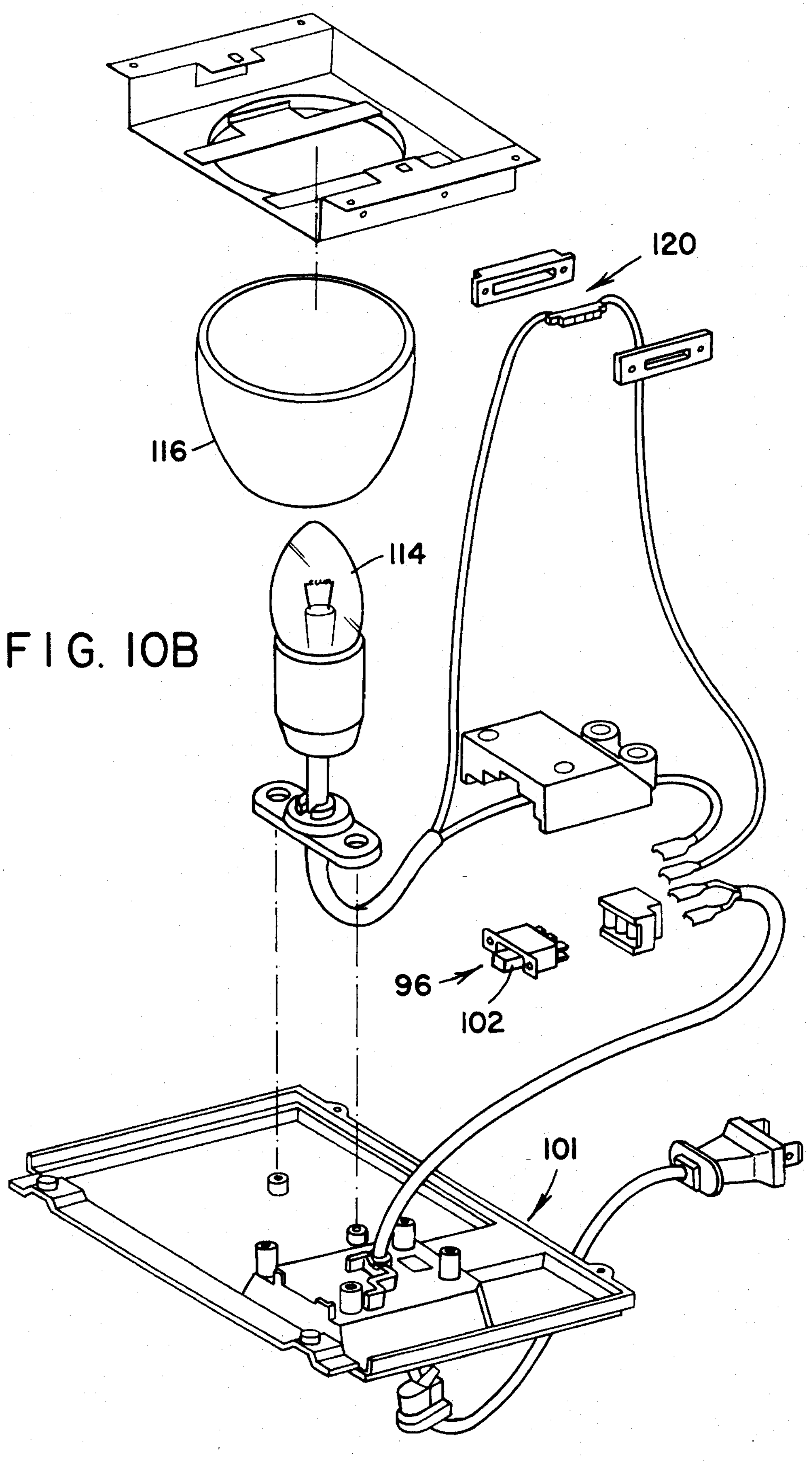

The heating compartment 73 may be of any suitable type. As shown in FIG. 10B, a light bulb 114 and reflector 116 direct heat to the top of the heating compartment 73 where the article to be heated is placed.

The oven 80 may include a timer and/or a fan as described above for oven 10. The light bulb 114 is of the 120 volt (or 220 volt) type, and therefore no transformer is required. A safety switch 120 may be provided to turn power off in the event that the temperature in the heating compartment exceeds a predetermined temperature.

While the invention has been described and illustrated in connection with preferred embodiments, many variations and modifications as will be evident to those skilled in this art may be made without departing from the spirit and scope of the invention. The invention as set forth in the appended claims is thus not to be limited to the precise details of construction set forth above as such variations and modifications are intended to be included within the spirit and scope of the invention as defined in the appended claims.

What is claimed is:

1. A toy oven comprising a heating compartment, an aperture in the oven through which an article to be heated can pass to enter the heating compartment, a door configured as a chute having a base portion, opposed sides projecting from the base portion, and open ends aligned with the aperture in an open position of the door permitting access to the aperture, means pivotally mounting the door to the oven to pivot between a closed position blocking the aperture and the open position, the base portion being sized such that in the open position of the door the base portion is generally perpendicular to the aperture, leaves the aperture unblocked and an end of the base portion enters or is closely adjacent the aperture and the remainder of the base portion extends away from the aperture and with the opposed sides functions as a guide to the aperture, and such that in the closed position of the door the base portion is generally parallel to the aperture and blocks the aperture.

2. The toy oven of claim 1 wherein the chute has opposed upper and lower major sides, the opposed sides projecting from the base portion being minor sides and connecting the opposed major sides, the base portion being flat and forming the lower major side of the chute.

3. The toy oven of claim 1 wherein the opposed upper and lower major sides are parallel and the opposed minor sides are parallel.

* * * * *